(12) United States Patent
Richmond

(10) Patent No.: US 11,518,868 B2
(45) Date of Patent: Dec. 6, 2022

(54) LASER TRANSMISSIVE COMPOSITIONS AND RELATED METHODS

(71) Applicant: Aptiv Technologies Limited, St. Michael (BB)

(72) Inventor: Zach Richmond, Warren, OH (US)

(73) Assignee: APTIV LIMITED TECHNOLOGIES

(*) Notice: Subject to any disclaimer, the term of this patent is extended or adjusted under 35 U.S.C. 154(b) by 0 days.

(21) Appl. No.: 17/089,076

(22) Filed: Nov. 4, 2020

(65) Prior Publication Data

US 2022/0135772 A1 May 5, 2022

(51) Int. Cl.

| | | |
|---|---|---|
| C08K 13/02 | (2006.01) | |
| C08K 5/00 | (2006.01) | |
| C08K 3/10 | (2018.01) | |
| C08L 67/02 | (2006.01) | |
| C08L 35/02 | (2006.01) | |
| C08K 3/22 | (2006.01) | |
| C08K 7/20 | (2006.01) | |
| B32B 37/06 | (2006.01) | |
| C08K 7/14 | (2006.01) | |
| C08K 5/053 | (2006.01) | |

(52) U.S. Cl.
CPC .............. *C08K 13/02* (2013.01); *B32B 37/06* (2013.01); *C08K 3/10* (2013.01); *C08K 3/22* (2013.01); *C08K 5/005* (2013.01); *C08K 7/14* (2013.01); *C08K 7/20* (2013.01); *C08L 35/02* (2013.01); *C08L 67/02* (2013.01); *B32B 2310/0843* (2013.01); *C08K 5/0083* (2013.01); *C08K 5/053* (2013.01); *C08K 2201/014* (2013.01); *C08L 2666/54* (2013.01)

(58) Field of Classification Search
CPC . C08K 13/02; C08K 7/14; C08K 7/20; C08K 7/28; C08K 2201/014; C08K 3/014; C08K 3/016; C08K 3/10; C08K 3/20; C08K 3/22; C08K 3/26; C08K 5/0008; C08K 5/005; C08K 5/0083; C08K 5/053; C08K 5/092; C08K 2003/262; C08K 2003/265; C08K 2003/267; C08K 2003/321; C08L 35/02; C08L 67/02; C08L 67/00; C08L 2666/54; C08L 2666/52; C08L 2666/68; C08L 2666/72; C08L 2666/78; C08L 2666/82; B32B 37/06; B32B 2310/0843; B29C 65/16

See application file for complete search history.

(56) References Cited

U.S. PATENT DOCUMENTS

| | | | |
|---|---|---|---|
| 6,150,454 A | 11/2000 | Wu et al. | |
| 8,318,051 B2 | 11/2012 | Adachi | |
| 8,680,167 B2 | 3/2014 | Agarwal et al. | |
| 2004/0084140 A1 | 5/2004 | Kobayashi | |
| 2007/0129475 A1* | 6/2007 | Sakata | B29C 66/24244 524/306 |
| 2011/0288220 A1* | 11/2011 | Benten | B29C 66/71 524/424 |
| 2011/0306707 A1 | 12/2011 | Benten et al. | |
| 2012/0149837 A1* | 6/2012 | Kumazawa | C08K 5/06 524/611 |
| 2012/0231285 A1* | 9/2012 | Von Benten | C08K 5/098 524/502 |
| 2012/0232204 A1* | 9/2012 | von Benten | C08K 3/18 524/405 |
| 2014/0167088 A1 | 6/2014 | Lu | |
| 2019/0337239 A1 | 11/2019 | Gunbas et al. | |

FOREIGN PATENT DOCUMENTS

JP 2009149839 A * 7/2009 .............. C08J 5/12

OTHER PUBLICATIONS

Machine translation of JP 2009149839 A, to Kumazawa et al. published Jul. 9, 2009 (Year: 2009).*
Extended European Search Report for EP Application No. 21206476.0, dated Mar. 14, 2022, 8 pages.

* cited by examiner

Primary Examiner — Jane L Stanley
(74) Attorney, Agent, or Firm — Billion & Armitage

(57) ABSTRACT

Embodiments of the present disclosure include laser transmissive compositions and related methods. The laser transmissive compositions may include one or more of the following components: (a) a polyester compound; (b) a filler; (c) a non-aromatic organic nucleating agent; (d) at least one of a chain extender and a branching agent, wherein the chain extender/branching agent includes two or more reactive groups attached thereto; (e) at least one heat stabilizer; (f) at least one process stabilizer; (g) at least one lubricant; and (h) one or more further additives.

20 Claims, 4 Drawing Sheets

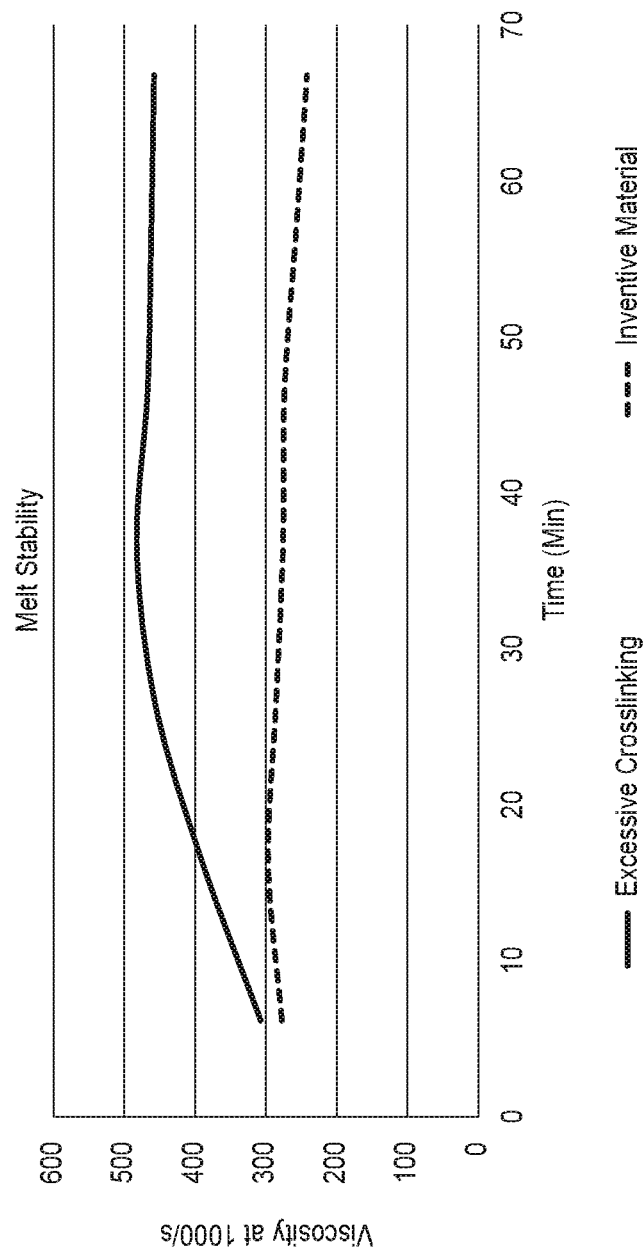

LASER TRANSMISSIVE COMPOSITIONS AND RELATED METHODS

BACKGROUND

Laser transmission welding processes use a high-power laser—with wavelengths in the range of, for example, 900 to 1200 nm—that passes through a laser transparent layer of polymer to a laser absorbent layer of polymer which absorbs the energy from the laser, causing it to heat up and weld the two materials together. Polymers such as polybutylene terephthalate (PBT) may be used to form the laser transparent polymer layer. PBT is known to have very low laser transmission as compared to other more transparent polymers, due to a high percentage of crystalline phases in which the polymer chains form highly ordered regions within the polymer, limiting its application in laser transmission welding processes. The crystalline phases of the polymer exhibit a different refractive index than the amorphous regions, causing the laser to be scattered as it passes through the polymer. The addition of glass fiber to increase the strength of the material for automotive electrical components, reduces the transmission even further. While prior art efforts to improve laser transparency of polymers, like PBT, include blending it with a more laser transparent polymer or including an aromatic sodium salt to reduce the size of the crystalline phase, there efforts have a detrimental effect on other properties (e.g., mechanical properties, thermal properties, viscoelastic properties, and environmental exposure properties), making them unsuitable for use.

SUMMARY

According to one or more aspects of the invention, a laser transmissive composition/laser weldable composition may include one or more of the following components: (a) a polyester compound; (b) a filler; (c) a non-aromatic organic nucleating agent; (d) at least one of a chain extender and a branching agent, wherein the chain extender/branching agent includes two or more reactive groups attached thereto; (e) at least one heat stabilizer; (0 at least one process stabilizer; (g) at least one lubricant; and (h) one or more further additives.

According to one or more other aspects of the invention, a method of preparing a laser transparent layer of a polymer for a laser transmission welding process may include forming a laser transmissive composition/laser weldable composition including one or more of the following components: (a) a polyester compound; (b) a filler; (c) a non-aromatic organic nucleating agent; (d) at least one of a chain extender and a branching agent, wherein the chain extender/branching agent includes two or more reactive groups attached thereto; (e) at least one heat stabilizer; (f) at least one process stabilizer; (g) at least one lubricant; and (h) one or more further additives.

According to one or more further aspects of the invention, a method of making an article of manufacture may include applying a laser to a laser transmissible layer of polymer and a laser absorbent layer of polymer to weld together at least a portion of the laser transmissible layer of polymer and at least a portion of the laser absorbent layer of polymer, wherein the laser transmissible layer of polymer includes a laser transmissive composition/laser weldable composition and wherein the laser transmissive composition/laser weldable composition includes one or more of the following components: (a) a polyester compound; (b) a filler; (c) a non-aromatic organic nucleating agent; (d) at least one of a chain extender and a branching agent, wherein the chain extender/branching agent includes two or more reactive groups attached thereto; (e) at least one heat stabilizer; (f) at least one process stabilizer; (g) at least one lubricant; and (h) one or more further additives.

According to one or more additional aspects of the invention, an article of manufacture may include a laser transmissive compound/laser weldable composition including one or more of the following components: (a) a polyester compound; (b) a filler; (c) a non-aromatic organic nucleating agent; (d) at least one of a chain extender and a branching agent, wherein the chain extender/branching agent includes two or more reactive groups attached thereto; (e) at least one heat stabilizer; (f) at least one process stabilizer; (g) at least one lubricant; and (h) one or more further additives.

BRIEF DESCRIPTION OF THE DRAWINGS

FIG. 4 is a graphical view showing melt viscosity stability, according to one or more embodiments of the invention.

DETAILED DESCRIPTION

Figure 1:
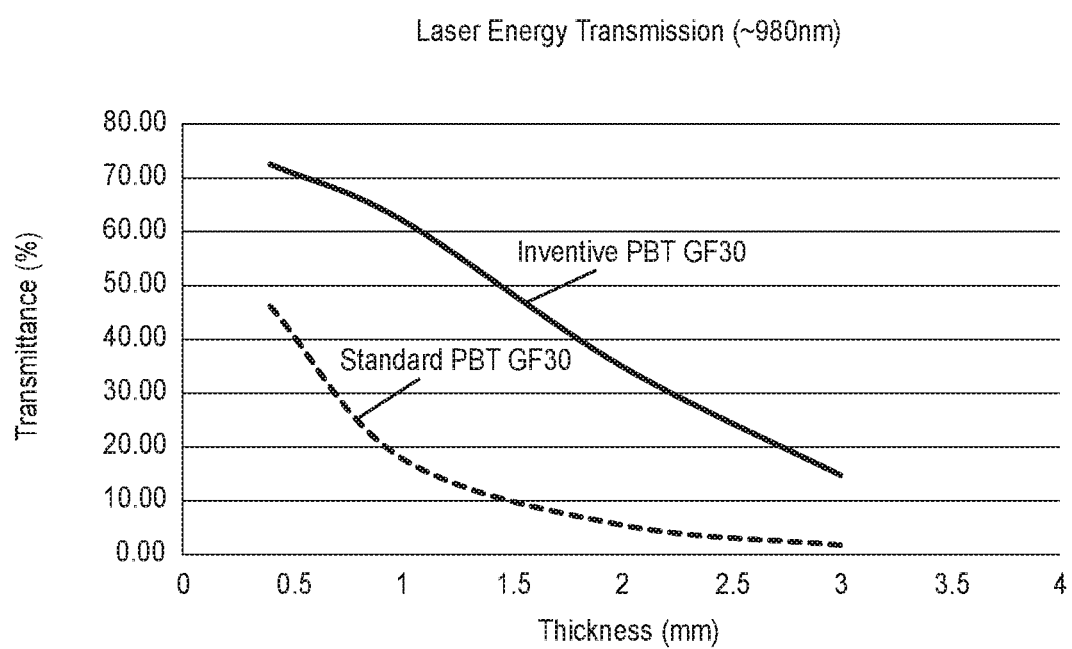
FIG. 1 is a graphical view showing laser transmittance versus thickness, according to one or more embodiments of the invention.

The present disclosure provides laser transmissive compositions, including related methods and related articles of manufacture, for laser transmission welding processes and other similar applications. As described herein, it has been discovered that the addition of a non-aromatic organic nucleating agent, in combination with at least one of a chain extender and a branching agent, to formulations including a polyester compound can increase the laser transparency of the polyester compound to a greater extent that the summation of the individual contributions to laser transparency from each component alone. Surprisingly further the combination of the non-aromatic organic nucleating agent and at least one of the chain extender and the branching agent can also improve the mechanical properties of the polyester compound, unlike prior art materials which degrade the polymer to an unusable form in the absence of further additives. The present disclosure also provides certain additive combinations for ensuring the laser transmissive composition remains processable and does not undergo excessive crosslinking. These additive combinations improve melt stability of the laser transmissive compositions by maintaining a stable melt viscosity, at the melt temperature, over extended durations. Other properties that may be improved include, without limitation, one or more of thermal properties, viscoelastic properties, and environmental exposure.

Embodiments of the present disclosure provide laser transmissive compositions that include a synergistic combination of additives for improving one or more properties of the polyester compound and/or the laser transmissive composition. The laser transmissive compositions are laser weldable compositions and thus those terms may be used interchangeably herein. In some embodiments, the laser transmissive composition/laser weldable composition includes one or more of the following components: (a) a polyester compound; (b) a filler; (c) a non-aromatic organic nucleating agent; (d) at least one of a chain extender and a branching agent, wherein the chain extender/branching agent includes two or more reactive groups attached thereto; (e) at least one heat stabilizer; (f) at least one process stabilizer; (g) at least one lubricant; and (h) one or more further additives, which may include, for example and without limitation, one or more of other fillers, colorants, impact modifiers, oxidative stabilizers, ultraviolet light stabilizers, flame retardant agents, plasticizers, flow enhancing agents, antistatic agents, crystallization promoting agents, and other processing aids or product enhancement additives known in the field of compounding polymers.

In some embodiments, the laser transmissive composition includes, based on the total weight of the laser transmissive composition, from about 30% to about 100% by weight of (a) a polyester compound; from about 0% to about 60% by weight of (b) a filler, such as for example 15% by weight, 20% by weight, or 30% by weight; from about 0.1% to about 0.5% by weight of (c) a non-aromatic organic nucleating agent; from about 0.1% to about 5% by weight of (d) at least one of a chain extender and a branching agent including two or more reactive groups attached thereto; from about 0% to about 1% by weight of (e) at least one heat stabilizer, such as for example from about 0.1% to about 0.5% by weight; from about 0% to about 1% by weight of (f) at least one process stabilizer, such as for example from about 0.1% to about 0.3% by weight; from about 0% to about 1% by weight of (g) at least one lubricant, such as for example 0.1% to about 0.6% by weight; and from about 0% to about 70% by weight of (i) one or more further additives. The foregoing ranges are inclusive of the range limits and of any incremental percentage range or percentage between the foregoing ranges, also inclusive.

The relative amounts of the components may be adjusted to refine one or more properties of the laser transmissive composition and/or polyester compound. These properties include, for example and without limitation, one or more of laser transparency, mechanical properties, thermal properties, viscoelastic properties, and environmental exposure. In some embodiments, the relative amounts are adjusted for other glass fiber amounts by changing the amounts of the glass fiber and polyester feedstock and adjusting the other ingredients based on the change in polyester amounts.

As mentioned above, the present disclosure provides laser transmissive compositions for improving one or more properties of the polyester compound. Laser transparency is one example of a property of polyester compounds, such as polybutylene terephthalate, that may need improvement. For example, polybutylene terephthalate may exhibit low laser transparency due to the presence of a high percentage of crystalline regions in which the polymer chains are highly ordered. These highly ordered regions may exhibit a refractive index that is different from the refractive index of amorphous regions. These differences in refractive index may cause a laser, for example, in the wavelength range of 600 nm to 1200 nm, or more likely 900 nm to 1200 nm, passing through the polybutylene terephthalate to be scattered by the crystalline regions, reducing laser transmission therethrough. Accordingly, in some embodiments, the laser transmissive compositions disclosed herein may include polyester compounds with poor laser transparency or otherwise in need of improvements in other properties.

Polyester compounds are thus not particularly limited and may include, for example, polyesters based on aromatic dicarboxylic acids and on an aliphatic or aromatic dihydroxyl compound, including for example polyalkylene terephthalates prepared by reacting aromatic dicarboxylic acids, or their esters or other ester-forming derivatives, with aliphatic dihydroxy compounds, such as alkenediols having from 2 to 6 carbon atoms. In some embodiments, the polyester compound includes one or more of polyethylene terephthalate (PET), polypropylene terephthalate (PPT), polybutylene terephthalate (PBT), polytrimethylene terephthalate (PTT), poly(methylene terephthalate) (PMT), and other polyesters formed of aliphatic monomers with terephthalic acid. In some embodiments, the polyester compound includes polybutylene terephthalate (PBT). In some embodiments, the polyester compound includes a polybutylene terephthalate (PBT) feedstock having a molecular weight of approximately 45 kDa to about 55 kDa. For example, in some embodiments, the polyester compound includes a PBT feedstock available from DuPont Crastin® 6131. Other polyester compounds suitable for use herein include, for example and without limitation, those disclosed in U.S. Pat. No. 8,889,768 B2 and U.S. Patent Application Publication No. 2018/0057684, both of which are hereby incorporated by reference in their entirety.

Fillers may be included in the laser transmissive compositions to improve mechanical properties, such as for example to reduce warpage, among other properties. The filler may have a dimension of about 1 mm or less. In some embodiments, the filler may have a dimension (e.g., a diameter) in the range of 6 µm and 14 µm, such as about 10 µm on average. Examples of fillers include, without limitation, glass fibers, glass strands, flat glass fibers, glass beads, hollow glass spheres, hollow glass beads, glass flakes, and the like. Other examples of fillers include, without limitation, amorphous silica, asbestos, calcium silicate, calcium metasilicate, magnesium carbonate, kaolin, chalk, powdered quartz, mica, barium sulfate, feldspar, aramid fibers, potassium titanate fibers, and the like. The fillers may be commercially available and may include PPG Industries HP 3786, among others. Some fillers may reduce laser transmission so using less filler may increase laser transmission. Some other fillers, such as talc, mica, and other mineral fillers, may absorb laser energy and, in some embodiments, may not be desirable for those reasons or, if used, only a small amount should be used. Carbon fillers such as carbon black, among others, may be a filler which is not used herein due to high absorption of laser. Some additives or fillers may be modified to match refractive indexes (RI), such as core shell impact modifiers. Altering RI may change the angles of refraction and/or the amount of reflection. Usually less scattering of the laser occurs as the RI of the polyester compound and the filler approach each other.

Non-aromatic organic nucleating agents may be used to form or create nucleating sites during processing, such as for example during cooling of the polymer from a melt. In particular, non-aromatic organic nucleating agent may promote the formation of crystallites that are both smaller in size and greater in number as compared to prior art nucleating agents (e.g., aromatic sodium nucleating agents), to provide a more homogeneous distribution of crystalline phases and amorphous phases and improve one or more of the laser transparency and mechanical properties of the polyester compound. In some embodiments, the non-aromatic organic nucleating agent is selected to reduce the size of at least a portion of the crystalline regions within the polyester compound to about 1 µm or less to reduce scattering and/or improve laser transparency. In some embodiments, the non-aromatic organic nucleating agents do not include (e.g., specifically exclude) an aromatic compound. For example, aromatic nucleating agents may degrade the polyester compounds or otherwise reduce the mechanical properties thereof to an extent that they are not usable. In some embodiments, the non-aromatic organic nucleating agents do not include (e.g., specifically exclude) a cyclic compound.

Suitable non-aromatic organic nucleating agents may include, for example and without limitation, inorganic salts. In some embodiments, the non-aromatic organic nucleating agents include metal salts. The metal salts may include one or more of the following metals: Li, Na, K, Rb, Cs, Mg, Ca, Sr, Ba, and Al. The metal salts may include one or more of the following anions: an alkoxide, a hydroxide, an acetate, a carbonate, a bicarbonate, a phosphate, and a citrate. The ratio of metals and anions may be balanced according to charge to form neutral metal salts. In some embodiments, the non-aromatic organic nucleating agents include one or more of the following: sodium alkoxides, sodium hydroxide, sodium acetate, sodium carbonate, sodium bicarbonate, sodium phosphate, sodium citrate, potassium alkoxides, potassium hydroxide, potassium acetate, potassium carbonate, potassium bicarbonate, lithium alkoxides, lithium hydroxide, lithium acetate, lithium carbonate, lithium bicarbonate, calcium alkoxides, calcium hydroxide, calcium acetate, calcium carbonate, calcium bicarbonates, magnesium alkoxides, magnesium hydroxide, magnesium acetate, magnesium carbonate, magnesium bicarbonates, aluminum alkoxides, aluminum hydroxide, aluminum acetate, aluminum carbonate, aluminum bicarbonates, lithium alkoxides, lithium hydroxide, lithium acetate, lithium carbonate, lithium bicarbonate, lithium phosphate, lithium citrate, rubidium alkoxides, rubidium hydroxide, rubidium acetate, rubidium carbonate, rubidium bicarbonate, rubidium phosphate, rubidium citrate, cesium alkoxides, cesium hydroxide, cesium acetate, cesium carbonate, cesium bicarbonate, cesium phosphate, cesium citrate, strontium alkoxide, strontium hydroxide, strontium acetate, strontium carbonate, strontium bicarbonate, strontium phosphate, strontium citrate, barium alkoxide, barium hydroxide, barium acetate, barium carbonate, barium bicarbonate, barium phosphate, and barium citrate. An example of an exemplary non-aromatic nucleating agent includes sodium acetate. Another example of an exemplary non-aromatic nucleating agent includes sodium carbonate.

Chain extenders and/or branching agents may improve the mechanical properties of the polyester compound. For example, fillers, such as glass fibers mentioned above, may be added to polyester compounds to increase their strength sufficient for use in automotive electrical components. When fillers are present, the presence of at least one of the chain extender and branching agent may improve adhesion of the polyester compound to said fillers. In some instances, the non-aromatic organic nucleating agent may reduce the molecular weight of the polyester compound. The chain extender and/or branching agent may be added to increase the molecular weight of the polyester compound, offsetting the reduction in molecular weight resulting from the presence of the non-aromatic organic nucleating agent and restoring or improving the mechanical properties of the polyester compound.

Suitable chain extenders and/or branching agents may include one or more of multifunctional monomers, oligomers, and polymeric additives having two or more reactive groups attached thereto. In some embodiments, the chain extender and/or branching agent includes greater than two reactive groups. For example, preferred chain extenders and/or branching agents may include four or more reactive groups, such as four to eight reactive groups. More preferred chain extenders and/or branching agents may include six or more reactive groups, such as six to eight reactive groups. The reactive groups of the chain extender and/or branching agent may be selected to react with the end groups of the polyester compound (e.g., one or more of the carboxylic acid end groups and hydroxyl end groups of polybutylene terephthalate). Although the reaction may proceed more rapidly with the end groups, branching and/or crosslinking is also expected. Accordingly, said reactive groups may also be selected to react with the polymer backbone, including functional groups attached thereto, of the polyester compound. Examples of suitable reactive groups include, without limitation, an epoxy group, a carboxy group, a latent carboxy group, an amino group, an amide group, an isocyanate group, and a carbonyl group, from which each of the two or more reactive groups may be independently selected. In some embodiments, the chain extender and/or branching agent includes two or more of diglycidyl ether, diisocyanate, maleic anhydride, acrylates, and derivatives thereof. An exemplary chain extender/branching agent includes novolac glycidyl ethers.

Suitable chain extenders and/or branching agents may also include one or more of impact modifiers, compatibilizers, chain extenders, branching agents, and the like. Glycidyl ether is a reactive group suitable for reacting with polyesters. Other types of reactive groups include glycidyl methacrylate, maleic anhydride, and isocyanates. Further examples include, without limitation, Dow Elvaloy PTW (GMA based), Polyscope Xibond Additives (MA/GMA based), ERL-4221 (cycloaliphatic glycidyl ether), Huntsman Araldite 2000 series epoxies (Bis-A, Bis-F glycidyl ethers, glycidyl ether/acrylate combinations), Phenolic novolac glycidyl ethers such as NanYa NPPN 400 and 600 series epoxies. Cresol Novolac glycidyl ethers such as NanYa NPCN-700 series epoxies, diisocyantates such as RheinChemie/Lanxess's Stabaxol additives (Stabaxol P). Glycidyl ethers of organic oils or fatty acids may also act as a lubricant and/or chain extender, such as epoxidized soybean or linseed oil. Oxazole additives such as 1,3 Phenylenebisoxazoline and Nexamite additives (Nexam Chemical, Nexamite A99) may also provide chain extension. Each of these additives should have at least one reactive group per molecule, such as for example two or more.

The two or more reactive groups of the chain extender and/or branching agent may react quickly, causing the polyester compound to undergo excessive crosslinking, during processing at normal melt temperatures, turning the thermoplastic into a thermoset which is not processable. The potential for excessive crosslinking may be high in injection molding processes, where the laser transmissive composition may be at the melt temperature for up to about an hour. Accordingly, a combination of certain additives is disclosed herein to balance the reactive groups of the chain extender/branching agent and ensure the laser transmissive composition maintains a stable melt viscosity over time and will not crosslink, for example, in the extruder barrel or hot runner mold. As described herein, in some embodiments, the melt viscosity of the laser transmissive composition is stable for extended durations (e.g., an hour or longer) by adding one or more of at least one heat stabilizer, at least one process stabilizer, and at least one lubricant.

Heat stabilizers may react with free radicals to interrupt thermoxidative chain scissioning and/or balance the crosslinking reaction. The heat stabilizer may include, for example and without limitation, one or more of phenolic antioxidants, hindered amines, phosphite antioxidants, sterically hindered phenols and/or phosphites, hydroquinones, aromatic secondary amines, such as diphenylamines, and various substituted versions of these. Sterically hindered phenolic primary antioxidants, such as Irganox® 1010, is an example of an exemplary heat stabilizer. The amount of heat stabilizers used may range from about 0.01% to about 1% by weight, based on the total weight of the laser transmissive composition, preferably 0.05% to about 1%, more preferably 0.05% to about 0.3% by weight, based on the total weight of the laser transmissive composition. The heat stabilizer may be selected and/or the amounts thereof may be adjusted to balance long term heat age results and prevent excessive crosslinking. In some embodiments, one or more of the foregoing may be used as oxidative stabilizers.

Process stabilizers may react with hydroperoxides to interrupt chain scissioning and crosslinking reactions to balance process stabilization with heat age results and prevent excessive crosslinking. The process stabilizer may include, for example and without limitation, phosphite stabilizers, including organic phosphite stabilizers. The amount of process stabilizers used may range from about 0.01% to about 1% by weight, based on the total weight of the laser transmissive composition, preferably about 0.05% to about 1%, more preferably about 0.05% to about 0.3% by weight. Amounts of about 1% may reduce mechanical properties and thus may have an adverse effect on the composition. The process stabilizer may be selected and/or the amounts thereof may be adjusted to obtain an optimal balance of process stabilization, heat age results, and preventing excessive crosslinking.

Suitable phosphite stabilizers may include, without limitation, one or more of the following: tris(2,4-di-tert-butylphenyl) phosphite (Irgafos® 168, BASF SE, CAS No. 31570-04-4), bis(2,4-di-tert-butylphenyl)pentaerythrityl diphosphite (Ultranox® 626, Chemtura, CAS No. 26741-53-7), bis(2,6-di-tert-butyl-4-methylphenyl)pentaerythrity diphosphite (ADK Stab PEP-36, Adeka, CAS No. 80693-00-1), bis(2,4-dicumylphenyl)pentaerythrityl diphosphite (Doverpho® S-9228, Dover Chemical Corporation, CAS No. 154862-43-8), Revonox 608, tris(nonylphenyl) phosphite (Irgafos® TNPP, BASF SE, CAS No. 26523-78-4), (2,4,6-tri-t-butylphenol)-2-butyl-2-ethyl-1,3-propanediol phosphite (Ultranox® 641, Chemtura, CAS No. 161717-324) or Hostanox® P-EPQ.

Lubricants may help maintain a stable melt viscosity and may prevent excessive crosslinking. They may include one or more of external lubricants and internal lubricants. Internal lubricants may improve slippage between polymer chains and fillers. External lubricants may rise to the surface during processing to improve lubrication between the polymer compound and the process equipment, such as a mold release. Both types tend to provide both internal and external lubrication, but specific lubricants may be more effective in one area than the other. One or more of an internal lubricant and an external lubricant may be included in the laser transmissive composition, preferably both an internal lubricant and an external lubricant are included. Examples of suitable lubricants include, without limitation, one or more of stearates including salts thereof, organic stearates (e.g., pentaerythritol tetrastearate), waxes, oligomeric materials, and dendritic molecules, oligomers, and polymers.

Metal stearates may be used as an external lubricant for processing and mold release. The metal cation contained in the stearate may prevent excessive crosslinking. Differences in the size, charge, reactivity, and other properties of the cation may promote excessive crosslinking. The charge also may determine the number of stearates attached to the metal cation. A larger positive charge and more stearate chains, along with lower overall reactivity of the metal ion may provide more stable melt viscosity. Examples of metal stearates include one or more of aluminum stearate, calcium stearate, lithium stearate, and zinc stearate, among others. Stearic acid, behenic acid, oligomeric materials, and all wax lubricants may also be used. Montan wax is an example of an internal lubricant which may be used herein. Montan waxes contain esters and hydroxyl groups that the chain extender may react with, preventing excessive crosslinking. The amount of lubricants used may range from about 0.1% to about 1% by weight, based on the total weight of the laser transmissive composition, preferably about 0.1% to about 0.3% by weight. The lubricants may be selected and/or the amounts thereof may be adjusted to provide a more stable melt viscosity while also preventing excessive crosslinking.

These additives including the heat stabilizer, process stabilizer, and lubricant may prevent crosslinking from occurring in the extruder barrel—which may increase torque significantly, hamper production rates, and make it not feasible for production—and also during any subsequent processing at the melt temperature in, for example, injection molding processes. For example, a challenging process for injection molding a material with the potential to crosslink is the use of hot runner molds. The hot runners generally remain hot while cooling down after a production run, and must be heated up to the melt temperatures again during the next startup. This leaves the possibility for the material to be at the melt temperature for up to 60 minutes. For this reason, the melt viscosity over time, or melt stability, may be a desirable property.

The non-aromatic sodium nucleating agents may also affect the crosslinking reaction. Sodium cations may catalyze the reactive groups of some chain extenders or reactive groups on the PBT polymer chains. In some embodiments, the levels of both the chain extender/branching agent and non-aromatic organic nucleating agent may be balanced balanced to help prevent excessive crosslinking while maintaining laser transmission properties.

As mentioned above, in addition to the aforementioned components, one or more further additives may be included in the laser transmissive composition. Examples of said additives include, without limitation, one or more of other fillers, colorants, impact modifiers, oxidative stabilizers, ultraviolet light stabilizers, one or more flame retardant agents, plasticizers, flow enhancing agents, antistatic agents, and crystallization promoting agents, and other processing aids or product enhancement additives known in the field of compounding polymers.

Additional other fillers, such as glass flakes or flat glass fibers, may offer improved dimensional stability with similar mechanical properties. Flat glass fibers from NEG may be used to provide improved dimensional stability. Glass flakes, such as FLEKA or Fineflake from Dreytek, may be added in addition to standard glass fiber to improve dimensional stability. These combinations may be useful in, for example, the automotive cover applications, where flatness of the cover or weld area is needed in order to setup the laser welding process accurately and for repeatability.

Flame-retardant additives may include inorganic flame retardants, such as magnesium hydroxide and aluminum hydroxide. Halogenated flame retardants containing halogens such as bromine may also be used with synergists such as metal borates and antimony trioxide. Non-halogenated organic flame retardants are most preferred and include derivatives of nitrogen and phosphorous such as one or more of melamine cyanurate, melamine phosphate, melamine polyphosphate, ammonium polyphosphate, red phosphorous, and aluminum diethylephosphinate. Specifically melamine derivatives and phosphinates may be particularly useful for PBT in electrical connectors. Mineral flame retardants require high loadings, and degrade mechanical, electrical, environmental, and viscoelastic properties. Halogenated flame retardants present health issues, especially with the inclusion of antimony trioxide, as well as significantly reduced electrical properties, among other property changes. Non-halogenated flame retardants may be useful for electrical connectors in automotive parts. Specific examples are Buddenheim's Budit additives, Clariant Exolit additives (Exolit 1240, 1248, 1260), and the like. Non-halogenated flame retardants for PBT may be used as well. Additionally, anti-drip agents may be added with flame retardants to reduce the tendency of the burning polymer to drip. These may include one or more of minerals such as talc and metal borates, other polymers such as PTFE, ionomers (Dow Surlyn), or silicone additives (Dow Siloxane additives), and previously mentioned branching/crosslinking agents, among others.

Impact modifiers may also be used, for example, as additives for PBT compounds, among other polyester compounds. The impact modifiers may be polymer or copolymer based with or without reactive groups to bond to the polyester compound (e.g., PBT) and/or fillers. These impact modifiers may contain elastic and/or rigid sections, and combinations thereof. Polyram Bondyram series and Dow Fusabond additives are ethylene-based impact modifiers with maleic anhydride reactive groups (Bonyram 7107, 7110). Dow Elvaloy PTW is an ethylene terpolymer impact modifier containing glycidyl methacrylate groups. Kraton offers various impact modifiers based on copolymers or terpolymers of various elastic and rigid polymers (Kraton FG-1901). Arkema and Kaneka offer core shell impact modifiers that may be altered to change the refractive index based on an elastic sphere with a rigid shell. Some examples include MBS and MMA core shell impact modifiers (Arkema Durastrength additives, Arkema Clearstrength additives, Kaneka M-731). Core shell impact modifiers may also contain silicone polymers such as Kaneka M-570, or other elastomeric and rigid combinations such as rubber cores.

Other additives may be used to improve the environmental conditioning of the laser weldable polyester (e.g., PBT) material. One considerable environmental impacts on, for example, PBT in general include high heat and humidity conditions which may lead to degradation of the polymer chains through hydrolysis. Therefore, hydrolysis resistance additives may be useful in laser weldable polyester (e.g., PBT) applications as well. Carboxylic end groups catalyze the hydrolysis reaction, and additives that reduce the carboxylic acid end groups of, for example, PBT may improve hydrolysis resistance. Additives mentioned previously as chain extenders/branching agents may also react with the PBT end groups, improving hydrolysis resistance. Additionally, the additives do not need to contain more than 1 reactive group. These additives may be called chain capping additives such as reactive silanes, siloxanes (Evonik Dynasylan additives), and other molecules with reactive groups that can cap the ends of the PBT chains and reduce carboxylic acid end groups.

The laser weldable compound may also be mixed with other polymers to form a polymer blend. Some polymers to mention include, for example and without limitation, one or more of PC, ASA, ABS, and PET, among others. These blends may be used for various reasons such as further improving laser transmission, altering mechanical, viscoelastic, environmental, electrical, and other properties. Additional additives to induce or prevent polymer interactions such as transesterification between PC and PBT are well established and may also be used. Modifiers such as previously mentioned chain extenders, branching agents, impact modifiers, and compatibilizers may also be used to improve compatibility of the blends, or alter the domain sizes of the respective polymers.

Colorants may include laser transparent color additives, which may include natural color colorants, laser transparent black colorants, among other colorants. In some embodiments, the colorants includes one or more of inorganic pigments, organic pigments, dyes such as nigrosine, and anthraquinones. The colorant may be present in an amount from about 0.1% to about 5% by weight based on the total weight of the laser transmissive composition, such as about 1% to about 5% by weight.

Plasticizers may include one or more of dioctyl phthalate, dibenzyl phthalate, butyl benzyl phthalate, hydrocarbon oils, and N-(n-butyl)benzenesulfoamide.

Ultraviolet light stabilizers may include substituted resorcinols, salicylates, benzotriazoles, and benzophenones.

In some embodiments, the laser transmissive compositions of the present disclosure may be characterized by one or more of the following properties: a polydispersity index of less than 2.00 (e.g., greater than 1.00 and less than 2.00 or any incremental range or value between 1.00 and 2.00); a molecular weight of greater than about 39,000 g/mol (e.g., up to about 70,000 g/mol or any molecular weight between 39,000 g/mol and 70,000 g/mol); from 0% to 100% of the crystalline phases having a dimension of about 1 µm; a laser transmission of greater than about 35% at about 1 mm thickness; less than about a 0% to about a 20% change in mechanical properties (e.g., tensile strength (MPA); elongation (%); impact strength ($kJ/m^2$)) upon exposure to moisture or ambient environment; and a viscosity that increases by no more than 25% or less (e.g., 10%) when held at the melt temperature for any duration, for example, about 60 min.

Embodiments of the present disclosure also provide methods of preparing a laser transparent polymer layer for a laser transmission welding process. The method of preparing a laser transparent polymer layer for a laser transmission welding process may include forming any of the laser transmissive compositions of the present disclosure (e.g., via polymer compounding).

Embodiments of the present disclosure further provide methods of making an article of manufacture. The method of making an article of manufacture may include applying a laser to a laser transmissible layer of polymer and a laser absorbent layer of polymer to weld together at least a portion of the laser transmissible layer of polymer and at least a portion of the laser absorbent layer of polymer, wherein the laser transmissible layer of polymer includes any of the laser transmissive composition of the present disclosure.

Embodiments of the present disclosure additionally provide articles of manufacture. The articles of manufacture may include any of the laser transmissive compositions of the present disclosure.

Non-limiting examples of articles of manufacture include one or more of the following: housing covers, such as short/medium/long range radars, sonar, Lidar, other sensory enclosures; other sealed housings, such as electronic housings, module housings, airbag enclosures, etc.; sealed electrical connectors such as power, signal, high speed data, and the like; and sealed radio frequency (RF) headers.

Discussion of Possible Embodiments

According to some embodiments, a laser transmissive composition may include a polyester compound; a non-aromatic organic nucleating agent; and at least one of a chain extender and a branching agent, the chain extender and the branching agent including two or more reactive groups attached thereto.

In some embodiments, the laser transmissive composition includes, based on the total weight of the laser transmissive composition, about 30% to about 100% by weight of the polyester compound; about 0.1% to about 0.5% by weight of the non-aromatic organic nucleating agent; and about 0.1% to about 1% by weight of at least one of the chain extender and the branching agent.

In some embodiments, the polyester compound includes one or more of polyethylene terephthalate (PET), polypropylene terephthalate (PPT), polybutylene terephthalate (PBT), polytrimethylene terephthalate (PTT), poly(methylene terephthalate) (PMT), and other polyesters formed of aliphatic monomers with terephthalic acid.

In some embodiments, the non-aromatic organic nucleating agent includes an inorganic salt.

In some embodiments, the non-aromatic organic nucleating agent includes a metal salt. In some embodiments, a metal of the metal salt includes one or more of Li, Na, K, Rb, Cs, Mg, Ca, Sr, Ba, and Al. In some embodiments, an anion of the metal salt includes one or more of an alkoxide, a hydroxide, an acetate, a carbonate, a bicarbonate, a phosphate, and a citrate.

In some embodiments, the chain extender and/or branching agent includes four to eight reactive groups attached thereto.

In some embodiments, the chain extender and/or branching agent includes six to eight reactive groups attached thereto.

In some embodiments, the chain extender and/or the branching agent includes one or more of phenolic novolac glycidyl ethers, cresol novolac glycidyl ethers, glycidyl methacrylates, maleic anhydrides, isocyanates, cycloaliphatic glycidyl ethers, Bis-A glycidyl ethers, Bis-F glycidyl ethers, glycidyl ether and acrylate combinations, diisocyanates, glycidyl ethers of organic oils, glycidyl ethers of fatty acids, oxazoles, and derivatives thereof.

In some embodiments, the two or more reactive groups of the chain extender and/or branching agent are independently selected from the group consisting of a cyano group, a carbonyl group, a carboxyl group, an epoxy group, an amino group, and an amide group.

In some embodiments, the laser transmissive composition further includes a filler, wherein the filler includes one or more of glass fibers, glass strands, flat glass fibers, glass beads, hollow glass spheres, and glass flakes. In some embodiments, the filler is present in an amount from 0% to 60% by weight based on the total weight of the laser transmissive composition.

In some embodiments, the laser transmissive composition further includes about 0.05% to about 1% of at least one heat stabilizer; about 0.05% to about 1% of at least one process stabilizer; and about 0.1% to about 1% of at least one lubricant.

In some embodiments, the viscosity of the laser transmissive composition increases by no more than 25% when held at the melt temperature for about 1 hr.

In some embodiments, the laser transmissive composition further includes about 0.05% to about 0.3% of a phenolic heat stabilizer; about 0.05% to about 0.3% of a phosphite heat stabilizer; and about 0.1% to about 0.3% of at least one lubricant.

In some embodiments, the lubricant includes one or more of a metal stearate, a metal distearate, a metal tristearate, and a montan wax.

According to some embodiments, an article of manufacture may include a laser transmissive composition of the present disclosure.

According to some embodiments, a laser transparent polymer layer may include a laser transmissive composition of the present disclosure.

According to some embodiments, a method of preparing a laser transparent polymer layer for a laser transmission welding process, the method including forming a laser transmissive composition of the present disclosure.

According to some embodiments, a method of making an article of manufacture may include applying a laser to a laser transmissible layer of polymer and a laser absorbent layer of polymer to weld together at least a portion of the laser transmissible layer of polymer and at least a portion of the laser absorbent layer of polymer, wherein the laser transmissible layer of polymer includes a laser transmissive composition of the present disclosure.

Example 1

Sample Formulations

Formulations included laser transmissive compositions including both a non-aromatic organic nucleating agent and at least one of a chain extender and a branching agent, wherein the chain extender and/or branching agent includes two or more reactive groups. This formulation is referred to as the Inventive PBT GF30 (and is described more fully in Table 5 and is referred to therein as Example 1 or E1), where PBT GF30 generally represents polybutylene terephthalate combined with about 30% by weight of glass fiber. For comparison, standard PBT GF30 was combined with 0.5% by weight of sodium benzoate as a nucleating agent, without any chain extender/branching agent, and is referred to as the Nucleated PBT GF30. In addition, standard PBT GF30 was also combined with at least one of the chain extender and branching agent which included cresol novolac glycidyl ether, without a nucleating agent, and is referred to as the Chain Extended PBT GF30.

Sample Preparations

Samples were produced on a 26 mm co-rotating twin screw extruder. A polybutylene terephthalate (PBT) feedstock and glass fibers were fed via dedicated feeders. The other components of the laser transmissive composition were dry blended by hand with additional PBT feedstock and fed with another feeder. The material was compounded at 400 RPMs at 70 lbs/hr. The melt was fed into a cooling water bath to form strands and pulled continuously into a pelletizer that cut the strands into pellets. Each sample was allowed to air cool for a period of time, e.g., for about 30-60 minutes, before being sealed in airtight and moisture proof foil bags. Before injection molding, each sample was tested to confirm less than 0.020% moisture by weight. Samples were dried in an oven set to a temperature of about 105° C. for approximately 1 hour before molding to remove any surface moisture. Test specimen (ISO Type 1A test bars)

were molded on an electric Engel E-Max 105 injection molding machine. Samples were then sealed in foil bags again to prevent moisture absorption.

Laser Transmission Measurements

Laser transmission was measured with a LPKF TMG-3 laser transmission tester. FIG. 1 is a graphical view of the laser transmission (e.g., about 980 nm wavelength) of the Inventive PBT GF30, which included a nucleating agent and a branching agent/chain extender, as compared to the control, the Standard PBT GF30. As can be seen from FIG. 1, the laser transmission of the Inventive PBT GF30 improved from 20% to 60% at 1 mm thickness, which is a common thickness for laser welded automotive electrical components.

Figure 2:
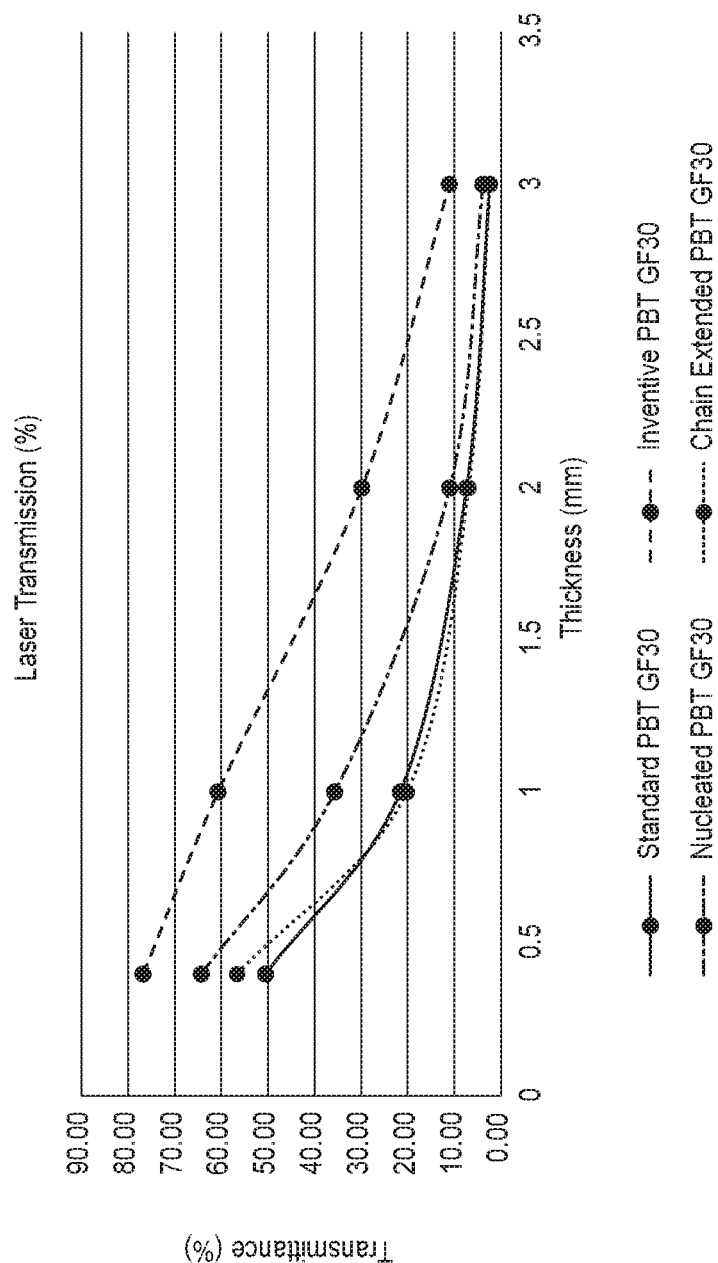
FIG. 2 is a graphical view showing a comparison of laser transmission, according to one or more embodiments of the invention.

FIG. 2 is a graphical view of the laser transmission of the Inventive PBT GF30 as compared to the Standard PBT GF30, the Nucleated PBT GF30, and the Chain Extended PBT GF30. As shown in FIG. 2, the combination of the non-aromatic organic nucleating agent and at least one of the chain extender and branching agent evidenced a synergistic effect on laser transmissibility of the PBT. In particular, an increase was observed with the addition of the nucleating agent only. No increase, or only minimal increase, was observed with the addition of the chain extender only. When the nucleating agent and the chain extender/branching agent were used in combination to prepare the laser transmissive composition, the increase in laser transmission was greater than the increase of the nucleating agent alone. This synergistic effect may be explained at least in part through reduction of the crystalline regions below 1 micron, and a reduction in overall crystallinity. The crystal sizes were reduced below about 1 μm in size to allow the laser to pass through them more easily, which is a function of refractive obstruction size and wavelength of the laser. However, it is possible that there may be a range of crystalline sizes both above and below 1 μm.

Mechanical Properties

Mechanical property testing was performed on dry as-molded test samples by an ISO accredited lab. Tensile, elongation, and tensile modulus were tested per ISO 527. Flexural strength and modulus were tested per ISO 179. Charpy and Notched Charpy impact were tested per ISO 178. Capillary Rheometry was performed at 250° C. on a Dynisco 7001 LCR Rheometer. The test setup used a 30:1 L/D die with a 1 mm circular orifice and a 120° C. inlet angle, at a shear sweep from 10,000/s-100/s. This test method conforms to ASTM D3835.

The Inventive PBT GF30 had similar mechanical properties to that of a standard PBT GF30 which can be seen in Table 1. The Nucleated PBT GF30 comparison example showed a reduction in mechanical properties. This was likely due to the mechanism of the nucleating agent reducing the molecular weight of the PBT, among other things. The Inventive PBT GF30 also exhibited improvements over the Standard PBT GF30 in terms of mechanical properties, which was seen in the higher tensile strength as well as impact strength. The non-aromatic organic nucleating agents likely created many, much smaller crystallites in the PBT material, making them more evenly distributed, and thus able to improve the mechanical properties by creating a more homogeneous distribution of crystalline and amorphous regions. The chain extender or branching agent also likely improved adhesion to the glass fiber, as well as increasing the molecular weight of the PBT, thereby offsetting the effects of reduction of molecular weight from the non-aromatic organic nucleating agent. Gel Permeation Chromatography (GPC) results confirm the increase in molecular weight as well as a decrease in Polydispersity Index (PDI), or a narrower range of molecular weights than the standard PBT, which can be seen in Table 2.

TABLE 1

Mechanical Properties

| Sample Desc | Standard PBT GF30 | Nucleated PBT GF30 | Inventive PBT GF30 |
|---|---|---|---|
| Tensile Strength (Mpa) | 140 | 119 | 147 |
| Elongation (%) | 3.0 | 2.0 | 3.0 |
| Tensile Modulus (Mpa) | 10560 | 10400 | 10940 |
| Impact Strength (kJ/m$^2$) | 52 | 30 | 58 |

TABLE 2

GPC Results

| Sample | Mw | Mn | P.D.I. |
|---|---|---|---|
| Standard PBT GF30 | ~38.8K | ~19.2K | 2.00 |
| Inventive PBT GF30 | ~47.5K | ~28.8K | 1.65 |

DSC Results

Figure 3:
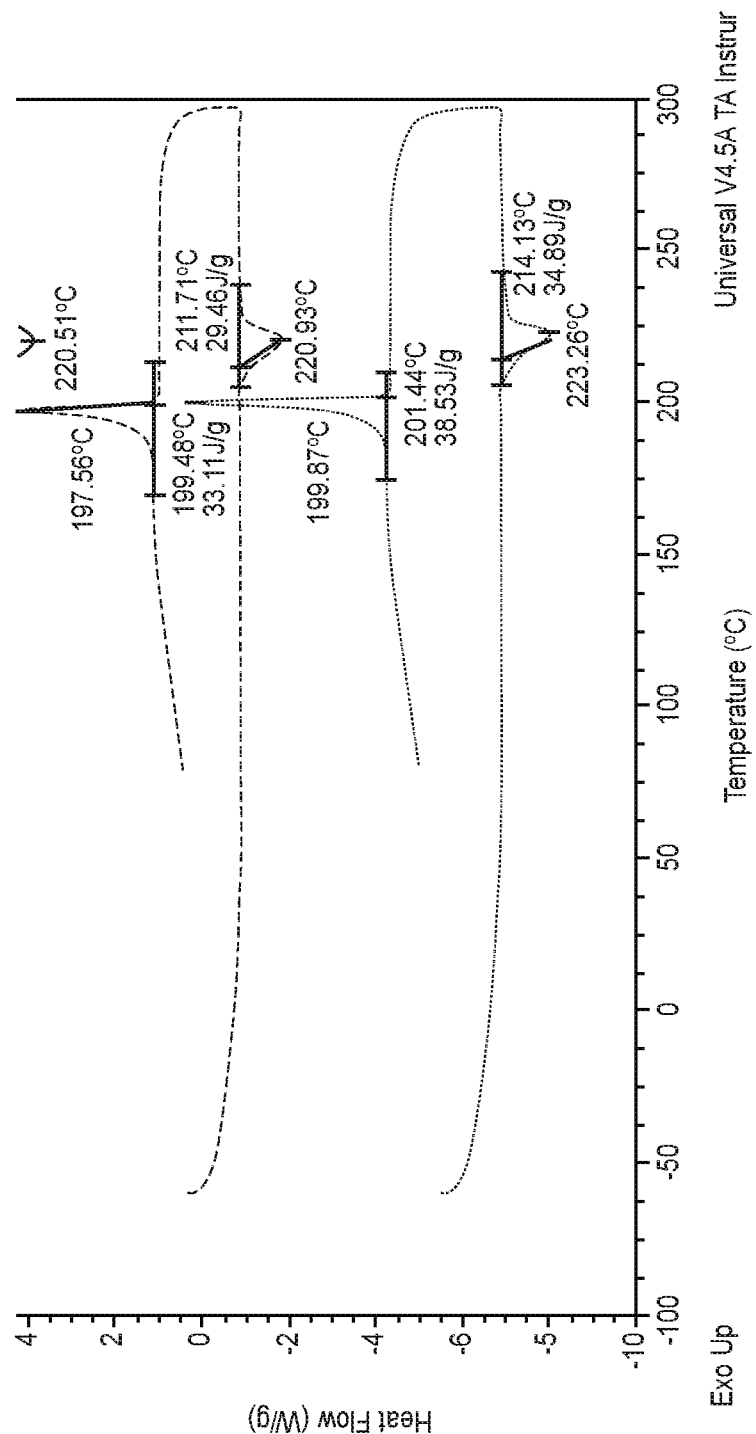
FIG. 3 is a graphical view showing DSC curves in which the top curve is the invention with nucleating agent and chain extender and the bottom curve is the nucleating agent only, according to one or more embodiments of the invention.

FIG. 3 and Table 3 show the DSC results for the Nucleated PBT GF30, which contained only the sodium benzoate nucleating agent, as well as the Inventive PBT GF30, which contained both the non-aromatic nucleating agent and the chain extender/branching agent. The percent crystallinity was confirmed to be reduced with the addition of the chain extender/branching agent. The Inventive PBT GF30 also showed a lower crystallization temperature (Tc). This was likely due to increased molecular weight of the PBT polymer and branching or crosslinking, inhibiting chain mobility.

TABLE 3

DSC Results

| Sample | Tc(° C.) | Crystallization Enthalpy (J/g) | Percent Crystallinity (%) |
|---|---|---|---|
| Nucleated PBT GF30 | 199.87 | 38.5 | 38% |
| Inventive PBT GF30 | 197.56 | 33.1 | 33% |

Environmental Conditioning

In addition to the Inventive PBT GF30 having better mechanical and laser transmission properties, it also performed better in environmental conditioning. Temperature-humidity exposure is often a highly degrading environment for PBT due to hydrolysis leading to degradation of the polymer's molecular weight. Table 4 shows improved retention of mechanical properties of the inventive material after environmental exposure. Samples were exposed to T3 (125° C.) Temperature Humidity conditioning per USCAR 2 Revision 6 Section 5.6.2 and compared to their initial mechanical properties.

TABLE 4

Mechanical Property Retention after Temperature-Humidity Aging

| Sample | Nucleated PBT GF30 | Inventive PBT GF30 |
|---|---|---|
| Tensile Strength (Mpa) | 65% | 90% |
| Elongation (%) | 40% | 70% |
| Impact Strength (kJ/m$^2$) | 40% | 65% |

Melt Stability

FIG. 4 shows that the Inventive PBT GF30 had a stable viscosity over time, and did not crosslink during the processing steps. A comparison shows a material that crosslinked at the melt temperature over 60 minutes. The Inventive PBT GF30 had a slight increase in the first 20 minutes, but below a 10% increase which would not cause any issues during processing. The excessively crosslinked material showed an overall increase of over 50%. The excessively crosslinked material can also crosslink much quicker depending on the formulation, and become a solid thermoset material in under 30 minutes depending on the extent of the crosslinking.

Example 2

Sample Formulations

The formulations for the control, laser transmissive composition, and comparative examples are summarized in Table 5. The control is standard PBT GF30, E1 is the laser transmissive composition, and CE1 to CE5 are comparative examples 1 to 5, respectively. Component A refers to a polybutylene terephthalate (PBT) feedstock with a molecular weight of approximately 45 kDa to 55 kDa (DuPont Crastin 6131). Component B refers to a filler including sized glass fiber having a 10 μm diameter (NEG 3786). Component C refers to zinc stearate (distearate). Component D refers to aluminum stearate (for which both distearates and tristearates may be present). Component E refers to montan wax. Component F refers to a phenolic heat stabilizer (Irganox 1010). Component G refers to a phosphite heat stabilizer (Revonox 608). Component H refers to sodium benzoate. Component I refers to sodium acetate. Component J refers to multifunctional Novolac glycidyl ether which has more than two reactive groups. Sample preparations were the same as described in Example 1.

Mechanical Properties

The mechanical properties are summarized in Tables 6-7. E1 showed exceptional mechanical properties, meeting or exceeding the mechanical properties of the control. E1 also showed significant improvements in laser transmission, as well as melt stability over 60 minutes. CE 1 showed significantly reduced mechanical properties when 0.50% sodium benzoate was added, while laser transmission was 45% at 1 mm thickness. CE2 used a lower amount of sodium benzoate, 0.25%. Even with the lower amount of sodium benzoate, the mechanical properties of CE2 were still reduced and there was no improvement to laser transmission, suggesting a threshold amount of nucleating agent is required to improve laser transmission. CE3 uses a non-aromatic nucleating agent, without the chain extender/branching agent, and properties similar to CE1 were observed. However, there was a slight improvement to laser transmission which is likely due to the milliequivalent of sodium in the sodium acetate compared to sodium benzoate, resulting in a higher sodium content overall and increasing nucleating. CE4 showed that the addition of the chain extender/branching agent increased the tensile strength and laser transmission. The synergy of the nucleating agent and chain extender/branching agent can be seen through the improved laser transmission at the same level of nucleating agent. However, the melt stability of CE4 was poor, which showed extensive crosslinking, increasing the viscosity 100% over 60 minutes. CE5 showed that increasing the chain extender can slightly improve the mechanical properties, but the material completely crosslinked during the melt stability test, making it unsuitable for use, especially in hot runner tools.

TABLE 6

Mechanical Properties

| Sample Desc | Control | Comparative Example 1 | Comparative Example 2 | Comparative Example 3 |
|---|---|---|---|---|
| Tensile Strength (Mpa) | 140 | 120 | 120 | 121 |
| Elongation (%) | 2.8 | 1.9 | 1.9 | 2.0 |
| Tensile Modulus (Mpa) | 10500 | 10800 | 10660 | 10240 |
| Impact Strength (kJ/m$^2$) | 56 | 31 | 43 | 23 |

TABLE 5

Sample Formulations

| Component | Control | E1 | CE1 | CE2 | CE3 | CE4 | CE5 |
|---|---|---|---|---|---|---|---|
| A | 100.00% | 69.80% | 68.85% | 69.30% | 69.55% | 69.30% | 68.80% |
| B | 30.00% | 30.00% | 30.00% | 30.00% | 30.00% | 30.00% | 30.00% |
| C | 0.10% | — | — | — | — | — | — |
| D | — | 0.10% | 0.10% | 0.10% | 0.10% | 0.10% | 0.10% |
| E | — | 0.10% | — | — | — | — | — |
| F | 0.10% | 0.30% | 0.10% | 0.10% | 0.10% | 0.10% | 0.10% |
| G | — | 0.10% | — | — | — | — | — |
| H | — | — | 0.50% | 0.25% | — | 0.50% | 0.35% |
| I | — | 0.20% | — | — | 0.50% | — | — |
| J | — | 0.35% | — | — | — | 0.50% | 1.00% |

TABLE 6-continued

Mechanical Properties

| Sample Desc | Control | Comparative Example 1 | Comparative Example 2 | Comparative Example 3 |
|---|---|---|---|---|
| Laser Transmission (%, 1 mm) | 21% | 45% | 20% | 52% |
| Melt Stability (% change/60 min) | −30% | −15% | N/A | N/A |

TABLE 7

Mechanical Properties

| Sample Desc | Control | Comparative Example 4 | Comparative Example 5 | Example 1 |
|---|---|---|---|---|
| Tensile Strength (Mpa) | 140 | 135 | 142 | 147 |
| Elongation (%) | 2.8 | 1.9 | 2.1 | 3.0 |
| Tensile Modulus (Mpa) | 10500 | 11200 | 11420 | 10700 |
| Impact Strength (kJ/m$^2$) | 56 | 36 | 58 | 58 |
| Laser Transmission (%, 1 mm) | 21% | 60% | 60% | 60% |
| Melt Stability (% change/60 min) | −30% | 100% | XL | −15% |

What is claimed is:

1. A laser transmissive composition comprising:
   a polyester compound in an amount that is at least 30% of the total weight of the laser transmissive composition;
   a nucleating agent in an amount that is between 0.1% and 0.5% of the total weight of the laser transmissive composition, wherein the nucleating agent is not an aromatic organic compound, and wherein the nucleating agent includes an inorganic salt; and
   at least one of a chain extender and a branching agent, the chain extender and/or the branching agent including two or more reactive groups attached thereto, wherein the chain extender and/or the branching agent make up between 0.1% and 1% of the total weight of the laser transmissive composition;
   wherein the nucleating agent reduces the size of crystalline regions within the polyester compound to about 1 μm or less and wherein the laser transmissive composition has a polydispersity index of between 1.00 and 2.00, a molecular weight of between 39,000 and 70,000 g/mol, a laser transmission of greater than 35% at 1 mm thickness, and a viscosity that increases by no more than 25% when held at melt temperature for 1 hour.

2. The laser transmissive composition of claim 1, wherein the polyester compound includes one or more of polyethylene terephthalate (PET), polypropylene terephthalate (PPT), polybutylene terephthalate (PBT), polytrimethylene terephthalate (PTT), poly(methylene terephthalate) (PMT), and other polyesters formed of aliphatic monomers with terephthalic acid.

3. The laser transmissive composition of claim 1, wherein a metal of the inorganic salt includes one or more of Li, Na, K, Rb, Cs, Mg, Ca, Sr, Ba, and Al.

4. The laser transmissive composition of claim 3, wherein the metal of the inorganic salt includes one or more of Li, Rb, Cs, Mg, Ca, Sr, Ba, and Al.

5. The laser transmissive composition of claim 3, wherein the nucleating agent includes one or more of sodium alkoxides, sodium hydroxide, sodium acetate, sodium phosphate, sodium citrate, potassium alkoxides, potassium hydroxide, potassium acetate, lithium alkoxides, lithium hydroxide, lithium acetate, lithium carbonate, lithium bicarbonate, calcium alkoxides, calcium hydroxide, calcium acetate, calcium carbonate, calcium bicarbonates, magnesium alkoxides, magnesium hydroxide, magnesium acetate, magnesium carbonate, magnesium bicarbonates, aluminum alkoxides, aluminum hydroxide, aluminum acetate, aluminum carbonate, aluminum bicarbonates, lithium alkoxides, lithium hydroxide, lithium acetate, lithium carbonate, lithium bicarbonate, lithium phosphate, lithium citrate, rubidium alkoxides, rubidium hydroxide, rubidium acetate, rubidium carbonate, rubidium bicarbonate, rubidium phosphate, rubidium citrate, cesium alkoxides, cesium hydroxide, cesium acetate, cesium carbonate, cesium bicarbonate, cesium phosphate, cesium citrate, strontium alkoxide, strontium hydroxide, strontium acetate, strontium carbonate, strontium bicarbonate, strontium phosphate, strontium citrate, barium alkoxide, barium hydroxide, barium acetate, barium carbonate, barium bicarbonate, barium phosphate, and barium citrate.

6. The laser transmissive composition of claim 1, wherein an anion of the inorganic salt includes one or more of an alkoxide, a hydroxide, an acetate, a carbonate, a bicarbonate, a phosphate, and a citrate.

7. The laser transmissive composition of claim 1, wherein the chain extender and/or branching agent includes four to eight reactive groups attached thereto.

8. The laser transmissive composition of claim 1, wherein the chain extender and/or branching agent includes six to eight reactive groups attached thereto.

9. The laser transmissive composition of claim 1, wherein the chain extender and/or the branching agent includes one or more of phenolic novolac glycidyl ethers, cresol novolac glycidyl ethers, glycidyl methacrylates, maleic anhydrides, isocyanates, cycloaliphatic glycidyl ethers, Bis-A glycidyl ethers, Bis-F glycidyl ethers, glycidyl ether and acrylate combinations, diisocyanates, glycidyl ethers of organic oils, glycidyl ethers of fatty acids, oxazoles, and derivatives thereof.

10. The laser transmissive composition of claim 1, wherein the two or more reactive groups of the chain extender and/or branching agent are independently selected from the group consisting of a cyano group, a carbonyl group, a carboxyl group, an epoxy group, an amino group, and an amide group.

11. The laser transmissive composition of claim 1, further comprising a filler, wherein the filler includes one or more of glass fibers, glass strands, flat glass fibers, glass beads, hollow glass spheres, and glass flakes.

12. The laser transmissive composition of claim 1, wherein, based on the total weight of the laser transmissive composition, the laser transmissive composition further includes:
   about 0.05% to about 1% by weight of at least one heat stabilizer;
   about 0.05% to about 1% by weight of at least one process stabilizer; and
   about 0.1% to about 1% by weight of at least one lubricant.

13. The laser transmissive composition of claim 12, wherein the lubricant includes one or more of a metal stearate, a metal distearate, a metal tristearate, and a montan wax.

14. The laser transmissive composition of claim 1, wherein the chain extender and/or branching agent includes one or more of a multifunctional monomer additive, a multifunctional oligomer additive, and a multifunctional polymeric additive, each having no more than two reactive groups attached thereto.

15. The laser transmissive composition of claim 14, wherein the nucleating agent is sodium acetate.

16. The laser transmissive composition of claim 1, wherein the nucleating agent is sodium acetate and is present in an amount that is 0.20% of the total weight of the laser transmissive composition, and wherein the chain extender and/or branching agent is a novolac glycidyl ether that includes two reactive groups attached thereto and is present in an amount that is 0.35% of the total weight of the laser transmissive composition.

17. An article of manufacture comprising: a laser transmissive composition according to claim 1.

18. A laser transparent polymer layer comprising: a laser transmissive composition according to claim 1.

19. A method of preparing a laser transparent polymer layer for a laser transmission welding process, the method comprising: forming a laser transmissive composition according to claim 1.

20. A method of making an article of manufacture comprising: applying a laser to a laser transmissible layer of polymer and a laser absorbent layer of polymer to weld together at least a portion of the laser transmissible layer of polymer and at least a portion of the laser absorbent layer of polymer, wherein the laser transmissible layer of polymer includes a laser transmissive composition according to claim 1.

* * * * *